(12) United States Patent
Naka et al.

(10) Patent No.: US 8,428,878 B2
(45) Date of Patent: Apr. 23, 2013

(54) LIGHTNING STRIKE SIMULATION APPARATUS, METHOD THEREOF, AND PROGRAM

(75) Inventors: Takehiro Naka, Nagasaki (JP); Tsuyoshi Wakasa, Nagasaki (JP); Shinji Arinaga, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 448 days.

(21) Appl. No.: 12/674,434

(22) PCT Filed: Jul. 16, 2008

(86) PCT No.: PCT/JP2008/062793
§ 371 (c)(1),
(2), (4) Date: Feb. 21, 2010

(87) PCT Pub. No.: WO2009/118921
PCT Pub. Date: Oct. 1, 2009

(65) Prior Publication Data
US 2011/0246074 A1 Oct. 6, 2011

(30) Foreign Application Priority Data
Mar. 24, 2008 (JP) ................................ 2008-076548

(51) Int. Cl.
*G06F 19/00* (2011.01)
(52) U.S. Cl.
USPC ... 702/4; 702/59; 702/66; 324/72; 324/76.33; 324/76.11; 340/601; 361/117; 361/138; 361/222; 361/126; 174/3; 174/4 R; 342/460; 342/465
(58) Field of Classification Search ............... 702/4, 59, 702/65, 189, 66, 127, 182, 183, 187, 188; 324/113, 96, 72, 72.5, 722, 76.33, 76.11; 340/601; 361/117, 138, 222, 126; 174/2, 174/3, 4 R; 342/460, 465
See application file for complete search history.

(56) References Cited

U.S. PATENT DOCUMENTS

| | | | | |
|---|---|---|---|---|
| 4,926,284 A | * | 5/1990 | Eugenio | 361/117 |
| 5,036,334 A | * | 7/1991 | Henderson et al. | 342/460 |

(Continued)

FOREIGN PATENT DOCUMENTS

| | | |
|---|---|---|
| JP | 1994186325 A | 7/1994 |
| JP | 1997080088 A | 3/1997 |

(Continued)

OTHER PUBLICATIONS

Zhenglong et al. "Simulation Model of Lightning Stroke to a Transmission Line Considering the Leader Propagation Randomicity", 2007, IEEE, pp. 1282-1286.*

(Continued)

*Primary Examiner* — Carol Tsai
(74) *Attorney, Agent, or Firm* — Kanesaka Berner & Partners, LLP (57) ABSTRACT

A lightning strike simulation apparatus includes a storage device for storing lightning strike data, a setting unit for setting a simulation target in a simulation space, a downward leader advancing unit for advancing a downward leader from a lightning strike start position set by the setting unit, an upward leader advancing unit for advancing upward leaders from lightning strike-receiving candidate points set in the simulation space when a distance between a leading edge of the downward leader and a reference point is within a first threshold value, and a lightning strike point determination unit for, when a distance between a leading edge of the downward leader and a leading edge of any one of the upward leaders is within a second threshold value, determining that the lightning strike-receiving candidate point corresponding to the any one of the upward leaders is a lightning strike point.

8 Claims, 10 Drawing Sheets

U.S. PATENT DOCUMENTS

| | | | |
|---|---|---|---|
| 7,468,879 B2* | 12/2008 | Rizk et al. | 361/220 |
| 7,960,647 B2* | 6/2011 | Rizk et al. | 174/3 |
| 7,970,542 B2* | 6/2011 | Bent et al. | 702/4 |
| 8,010,289 B1* | 8/2011 | Ryan et al. | 702/4 |
| 2007/0115607 A1* | 5/2007 | Rizk et al. | 361/220 |
| 2008/0095624 A1* | 4/2008 | Lewke | 416/146 R |
| 2008/0262732 A1* | 10/2008 | Davis et al. | 702/4 |
| 2009/0240434 A1* | 9/2009 | Makela et al. | 702/4 |
| 2010/0006312 A1* | 1/2010 | Rizk et al. | 174/2 |
| 2010/0236808 A1* | 9/2010 | Rizk et al. | 174/3 |

FOREIGN PATENT DOCUMENTS

| | | | |
|---|---|---|---|
| JP | 2005-099942 | * | 4/2005 |
| JP | 2005-099942 A | | 4/2005 |
| JP | 2006184113 A | | 7/2006 |
| JP | 20098620 A | | 1/2009 |
| TW | 200405637 A | | 4/2004 |
| TW | 200743804 A | | 12/2007 |

OTHER PUBLICATIONS

KIPO Notice of Allowance for KR10-2010-7003684, dated May 14, 2012.

"The Effect of Lighting Tower Built for Lighting Attraction Separately from Wind Turbine", The Institute of Electrical Engineers of Japan Kenkyukai Shiryo, Nov. 10, 2005, vol. ED-05, No. 134-142, pp. 7-10.

International Search Report of Application No. PCT/JP2008/062793 mailed Sep. 22, 2008.

Japanese Language Decision to Grant a Patent.

English Language Translation of Japanese Decision to Grant a Patent.

Taiwan Search Report.

* cited by examiner

| LIGHTNING CURRENT PEAK VALUE [kA] | OCCURRENCE FREQUENCY [%] | RATIO [%] |
|---|---|---|
| 0 ~ 10 | 5.0 | 5.0 |
| 10 ~ 20 | 19.2 | 24.2 |
| 20 ~ 30 | 23.6 | 47.9 |
| 30 ~ 40 | 18.1 | 66.0 |
| 40 ~ 50 | 11.6 | 77.6 |
| 50 ~ 60 | 7.2 | 84.8 |
| 60 ~ 70 | 4.5 | 89.3 |
| 70 ~ 80 | 2.9 | 92.2 |
| 80 ~ 90 | 1.9 | 94.1 |
| 90 ~ 100 | 1.3 | 95.5 |
| 100 ~ 110 | 1.0 | 96.4 |
| 110 ~ 120 | 0.70 | 97.1 |
| 120 ~ 130 | 0.53 | 97.6 |
| 130 ~ 140 | 0.40 | 98.0 |
| 140 ~ 150 | 0.31 | 98.3 |
| 150 ~ 160 | 0.25 | 98.6 |
| 160 ~ 170 | 2.0 | 98.8 |
| 170 ~ 180 | 0.16 | 99.0 |
| 180 ~ 190 | 0.13 | 99.1 |
| 190 ~ 200 | 0.11 | 99.2 |
| 200 ~ | 0.79 | 100.0 |

FIG. 4

| VERTICAL ANGLE φ [deg] | OCCURRENCE FREQUENCY [%] | RATIO [%] |
|---|---|---|
| 0 ~ 5 | 1.1 | 1.1 |
| 5 ~ 10 | 3.4 | 4.5 |
| 10 ~ 15 | 5.4 | 9.9 |
| 15 ~ 20 | 7.2 | 17.0 |
| 20 ~ 25 | 8.5 | 25.6 |
| 25 ~ 30 | 9.5 | 35.0 |
| 30 ~ 35 | 10.0 | 45.0 |
| 35 ~ 40 | 10.0 | 55.0 |
| 40 ~ 45 | 9.6 | 64.6 |
| 45 ~ 50 | 8.8 | 73.4 |
| 50 ~ 55 | 7.7 | 81.1 |
| 55 ~ 60 | 6.4 | 87.5 |
| 60 ~ 65 | 5.0 | 92.4 |
| 65 ~ 70 | 3.6 | 96.0 |
| 70 ~ 75 | 2.3 | 98.3 |
| 75 ~ 80 | 1.2 | 99.5 |
| 80 ~ 85 | 0.46 | 99.9 |
| 85 ~ 90 | 0.070 | 100.00 |

| Case. No. | Rod-Receptor INSTALLATION SITUATION | Disk-Receptor INSTALLATION SITUATION 1 | Disk-Receptor INSTALLATION SITUATION 2 | Disk-Receptor INSTALLATION SITUATION 3 | PITCH ANGLE | LIGHTNING ROD LENGTH | LIGHTNING ROD POSITION | LIGHTNING STRIKE-RECEIVING RATE (%) | | |
|---|---|---|---|---|---|---|---|---|---|---|
| | | | | | | | | AZIMUTH ANGLE A° | AZIMUTH ANGLE B° | AZIMUTH ANGLE C° |
| 1 | A | A | A | A | A | A | A | 88.2 | 86.0 | 91.2 |
| 2 | A | A | B | B | B | B | B | 88.3 | 86.4 | 91.4 |
| 3 | A | A | C | C | C | C | C | 88.6 | 87.6 | 91.2 |
| 4 | A | B | A | A | B | B | C | 88.6 | 86.7 | 91.6 |
| 5 | A | B | B | B | C | C | A | 88.5 | 86.5 | 91.5 |
| 6 | A | B | C | C | A | A | B | 88.2 | 86.0 | 91.2 |
| 7 | A | C | A | B | A | C | B | 88.6 | 86.7 | 91.6 |
| 8 | A | C | B | C | B | A | C | 88.2 | 86.0 | 91.2 |
| 9 | A | C | C | A | C | B | A | 88.5 | 86.5 | 91.5 |
| 10 | B | A | A | C | A | B | B | 61.2 | 49.0 | 61.2 |
| 11 | B | A | B | A | B | C | C | 52.5 | 47.1 | 63.7 |
| 12 | B | A | C | B | C | A | A | 25.0 | 18.2 | 28.7 |
| 13 | B | B | A | B | C | B | C | 55.4 | 41.8 | 53.8 |
| 14 | B | B | B | C | A | C | A | 50.0 | 44.9 | 57.6 |
| 15 | B | B | C | A | B | A | B | 40.8 | 34.3 | 49.5 |
| 16 | B | C | A | C | B | C | A | 64.6 | 51.5 | 64.6 |
| 17 | B | C | B | A | C | A | B | 40.7 | 35.6 | 44.4 |
| 18 | B | C | C | B | A | B | C | 36.4 | 32.0 | 47.0 |

# LIGHTNING STRIKE SIMULATION APPARATUS, METHOD THEREOF, AND PROGRAM

RELATED APPLICATIONS

The present application is based on International Number PCT/JP2008/062793, filed Jul. 16, 2008, and claims priority from, Japanese Application Number 2008-076548, filed Mar. 24, 2008, the disclosures of which are hereby incorporated by reference herein in their entirety.

TECHNICAL FIELD

The present invention relates to a lightning strike simulation apparatus.

BACKGROUND ART

Conventionally, a rolling sphere method has been known as a simulation model relating to lightning.

The rolling sphere method is a common lightning shielding model based on an electro-geometric model. A probability of being struck by lightning is derived only from a geometrical shape of an object and a peak value of current, i.e., a parameter of lightning. In the rolling sphere method, a striking distance (distance over which a lightning finally jumps) is uniquely determined from the peak value of current, and any object within a range of the striking distance is considered to be struck by lightning (for example, see Patent Citation 1 below).

Patent Citation 1

Japanese Unexamined Patent Publication No. 2005-99942

DISCLOSURE OF INVENTION

In the above-described rolling sphere method, however, a lightning strike point is estimated based only on an electro-geometric model of a structure. Therefore, there is a problem in that accuracy of lightning strike simulation is low.

The present invention is made to solve the above problem, and it is an object of the present invention to provide a lightning strike simulation apparatus capable of improving the accuracy of lightning strike simulation.

In order to solve the above problem, the present invention employs the following solutions.

The present invention provides a lightning strike simulation apparatus including: a storage unit for storing lightning strike data generated based on statistical data of a lightning strike occurred in nature; a setting unit for setting in a simulation space a simulation target, at least one or more lightning strike-receiving candidate points, a reference point, a lightning strike start position, and a lightning electric-current peak value; a downward leader advancing unit for advancing a downward leader from the lightning strike start position set by the setting unit; an upward leader advancing unit for respectively advancing upward leaders from the lightning strike-receiving candidate points set in the simulation space, when a distance between a leading edge of the downward leader and the reference point is within a first threshold value; and a lightning strike point determining unit for, when a distance between the leading edge of the downward leader and a leading edge of any one of the upward leaders is within a second threshold value, determining that a lightning strike-receiving candidate point corresponding to the any one of the upward leaders is a lightning strike point, wherein the downward leader advancing unit and the upward leader advancing unit respectively advance the downward leader and the upward leader based on the lightning strike data stored in the storage unit.

According to the above configuration, the setting unit sets initial conditions such as the simulation target in the simulation space, at least one or more lightning strike-receiving candidate points, the reference point, the lightning strike start position, and the lightning electric-current peak value. After the initial conditions are set, the downward leader advancing unit advances the downward leader from the lightning strike start position. The downward leader is repeatedly advanced, and when the distance between the leading edge of the advanced downward leader and the reference point set by the setting unit is within the first threshold value, advance of the downward leader is stopped. Subsequently, the upward advancing unit respectively advances the upward leaders from the lightning strike-receiving candidate points. Then, when the distance between the leading edge of any one of the upward leaders thus advanced and the leading edge of the downward leader is equal to or less than the second threshold value, the lightning strike-receiving candidate point from which the upward leader is advanced is determined to be a lightning strike point by the determining unit. In this case, the downward leader advancing unit and the upward leader advancing unit respectively advance the downward leader and the upward leader based on the lightning strike data generated based on the statistical data of lightning occurred in the nature stored in the storage unit. Therefore, a highly accurate simulation result reflecting actual lightning strike situations can be obtained.

In the lightning strike simulation apparatus, the upward leader advancing unit may change advancement of the upward leader in accordance with a tendency of receiving a lightning strike at the lightning strike-receiving candidate point.

In this manner, a degree of advancement of the upward leader can be changed in accordance with the tendency of receiving a lightning strike at the lightning strike-receiving candidate point (for example, lightning is more likely to strike a metal rather than an insulating object). Therefore, the tendency of actual lightning strikes can be more accurately reflected in the simulation.

For example, the upward leader advancing unit makes a length of the upward leader advanced from a lightning strike-receiving candidate point on a metal material, longer than a length of the upward leader advanced from a lightning strike-receiving candidate point on an insulating material.

In the above lightning strike simulation apparatus, the storage unit stores the lightning strike data in association with an affecting factor that affects the tendency of receiving a lightning strike, and when the setting unit sets a simulation condition, the downward leader and the upward leader may use the lightning strike data corresponding to the simulation condition to respectively advance the downward leader and the upward leader.

For example, the tendency of receiving a lightning strike is different according to various factors such as season and topography. Therefore, the factors affecting the tendency of receiving lightning strikes are stored in association with the lightning strike data. When simulation is performed, the lightning strike data associated with the affecting factor corresponding to the simulation condition setting (for example, the season is summer, and the location is X city) are extracted from the storage device. Then, the downward leader advancing unit and the upward leader advancing unit respectively advance the downward leader and the upward leader, using the extracted lightning strike data. Accordingly, the lightning strike simulation is performed using only the lightning strike data corresponding to this simulation setting condition, so that the accuracy of lightning strike simulation can be further improved.

In the above lightning strike simulation apparatus, an example of a simulation target includes a windmill.

In the above lightning strike simulation apparatus, the setting unit may set the lightning strike start position and the lightning electric-current peak value by using a random number based on the lightning strike data stored in the storage unit.

Accordingly, the lightning strike start position and the lightning electric-current peak value are set based on the lightning strike data generated from the statistical data of lightning strikes. Therefore, the accuracy of simulation can be further improved.

The above lightning strike simulation apparatus further includes an input unit, and when the lightning strike-receiving candidate point is inputted from the input unit, the setting unit may set the lightning strike-receiving candidate point based on this input information.

In this way, the input unit allows a user to set a lightning strike-receiving candidate point at a desired position in a simulation space.

The present invention provides a lightning strike simulation method including the steps of: setting a simulation target in a simulation space, at least one or more lightning strike-receiving candidate points, a reference point, a lightning strike start position, and a lightning electric-current peak value; advancing a downward leader from the lightning strike start position having been set; respectively advancing upward leaders from the lightning strike-receiving candidate points set in the simulation space when a distance between a leading edge of the downward leader and the reference point is within a first threshold value; and when a distance between the leading edge of the downward leader and a leading edge of any one of the upward leaders is within a second threshold value, determining that a lightning strike-receiving candidate point corresponding to the any one of the upward leaders is a lightning strike point, wherein the downward leader and the upward leader are respectively advanced based on the lightning strike data generated based on statistical data of lightning strike occurred in nature.

The present invention provides a lightning strike simulation program for causing a computer to execute the processings of: setting a simulation target in a simulation space, at least one or more lightning strike-receiving candidate points, a reference point, a lightning strike start position, and a lightning electric-current peak value; advancing a downward leader from the lightning strike start position based on lightning strike data generated based on statistical data of lightning strike occurred in nature; respectively advancing upward leaders from the lightning strike-receiving candidate points set in the simulation space based on the lightning strike data when a distance between a leading edge of the downward leader and the reference point is within a first threshold value; and when a distance between the leading edge of the downward leader and a leading edge of any one of the upward leaders is within a second threshold value, determining that a lightning strike-receiving candidate point corresponding to the any one of the upward leaders is a lightning strike point.

The present invention achieves an effect of improving the accuracy of lightning strike simulation.

EXPLANATION OF REFERENCE

1: CPU
2: Main storage device
3: Auxiliary storage device
4: Input device
5: Output device
10: Lightning strike simulation apparatus
11: Storage device
12: Setting unit
13: Downward leader advancing unit
14: Upward leader advancing unit
15: Lightning strike point determining unit

BEST MODE FOR CARRYING OUT THE INVENTION

Embodiments of a lightning strike simulation apparatus according to the present invention will be hereinafter described with reference to the attached drawings.

First Embodiment

Figure 1:
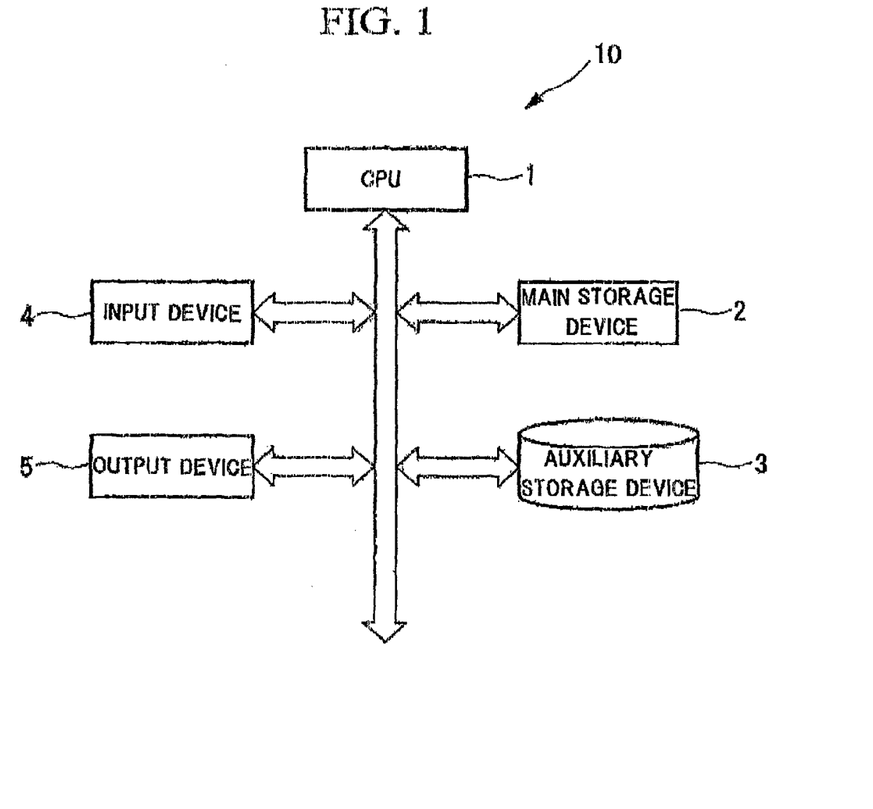
FIG. 1 A diagram showing an example of a hardware configuration of a lightning strike simulation apparatus according to an embodiment of the present invention.

FIG. 1 is a block diagram showing a schematic configuration of a lightning strike simulation apparatus according to a first embodiment of the present invention.

As shown in FIG. 1, a lightning strike simulation apparatus 10 according to the present invention is a computer system (calculator system), which includes a CPU (Central Processing Unit) 1, a main storage device 2 such as RAM (Random Access Memory), a ROM (Read Only Memory), an auxiliary storage device 3 such as an HDD (Hard Disk Drive), an input device 4 such as a keyboard and a mouse, an output device 5 such as a monitor and a printer, and the like.

The auxiliary storage device 3 stores various programs. The CPU 1 loads programs from the auxiliary storage device 3 to the main storage device 2 such as RAM, and executes the programs, thus enabling various processings.

Figure 2:
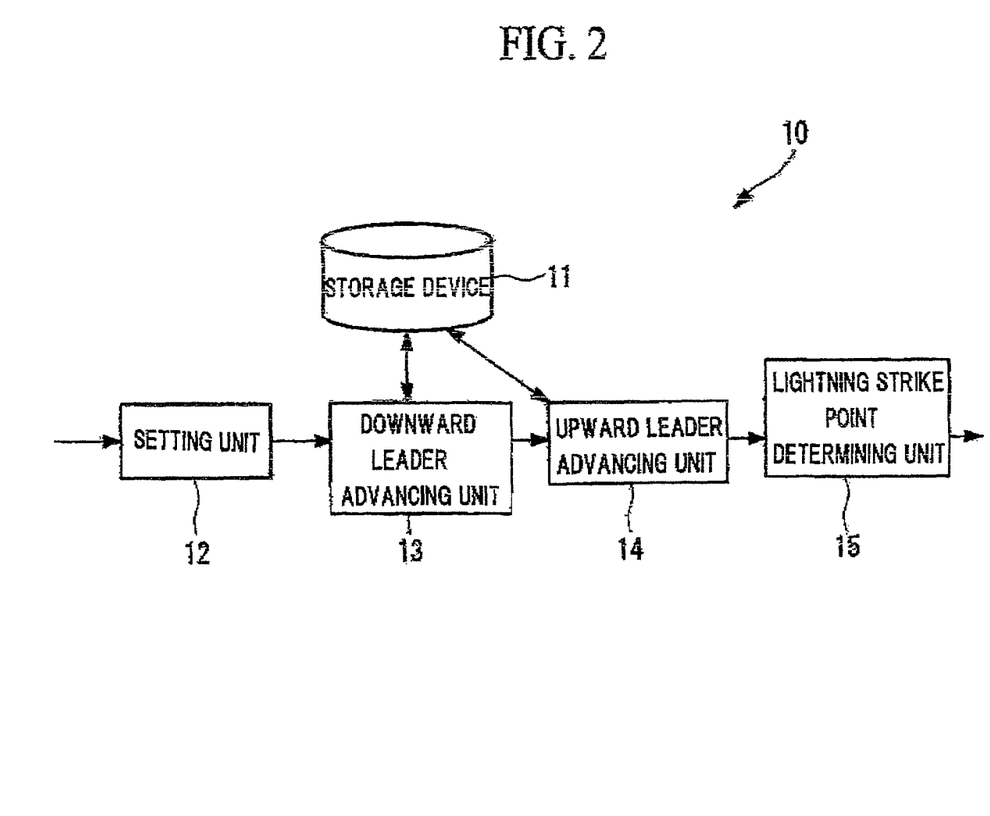
FIG. 2 An exploded block diagram showing functions of the lightning strike simulation apparatus according to the embodiment of the present invention.

FIG. 2 is an exploded functional block diagram showing functions of the lightning strike simulation apparatus 10. As shown in FIG. 2, the lightning strike simulation apparatus 10 includes a storage device (storage unit) 11, a setting unit (setting unit) 12, a downward leader advancing unit 13, an upward leader advancing unit 14, and a lightning strike point determining unit 15.

Figure 3:
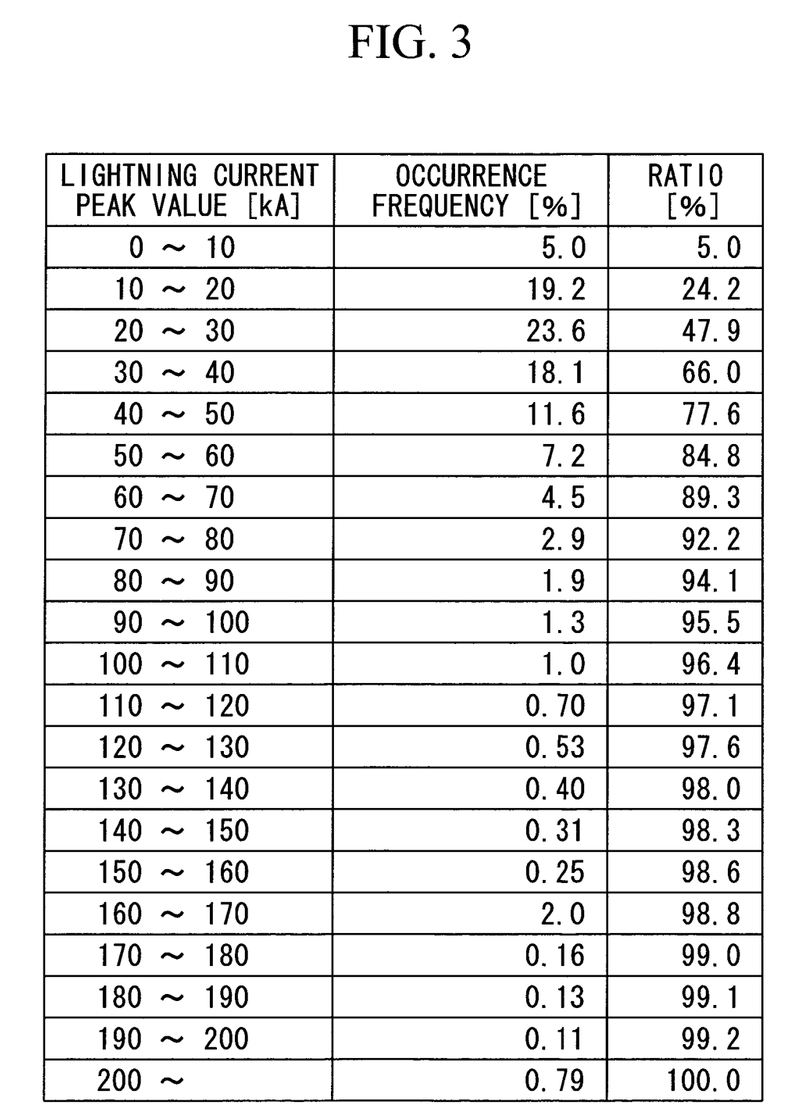
FIG. 3 A table showing an example of frequency distribution of lightning electric-current peak value, which is one of lightning strike data stored in a storage device.
Figure 4:
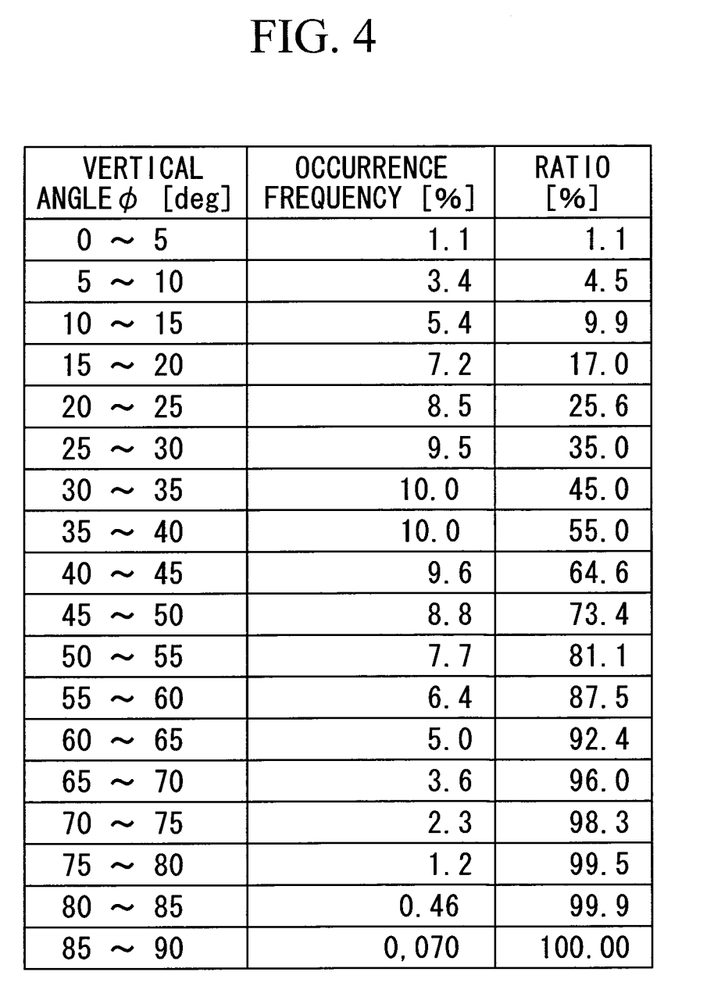
FIG. 4 A table showing an example of frequency distribution of advancing vertical angle of a downward leader, which is one of the lightning strike data stored in the storage device.

The storage device 11 stores various data necessary in carrying out lightning strike simulation. An example of such data includes lightning data. The lightning data is generated based on statistical data of lightning occurred in the nature. For example, the lightning data represent a magnitude and a frequency of lightning occurred and a direction in which the lightning is likely to advance. More specifically, the storage device 11 stores a portion of the lightning data that includes: a frequency distribution of lightning electric-current peak value, as shown in FIG. 3, associated with lightning electric-current peak value (kA), occurrence frequency (%), and ratio (%); and a frequency distribution of an advancing vertical angle of a downward leader as shown in FIG. 4.

Figure 5:
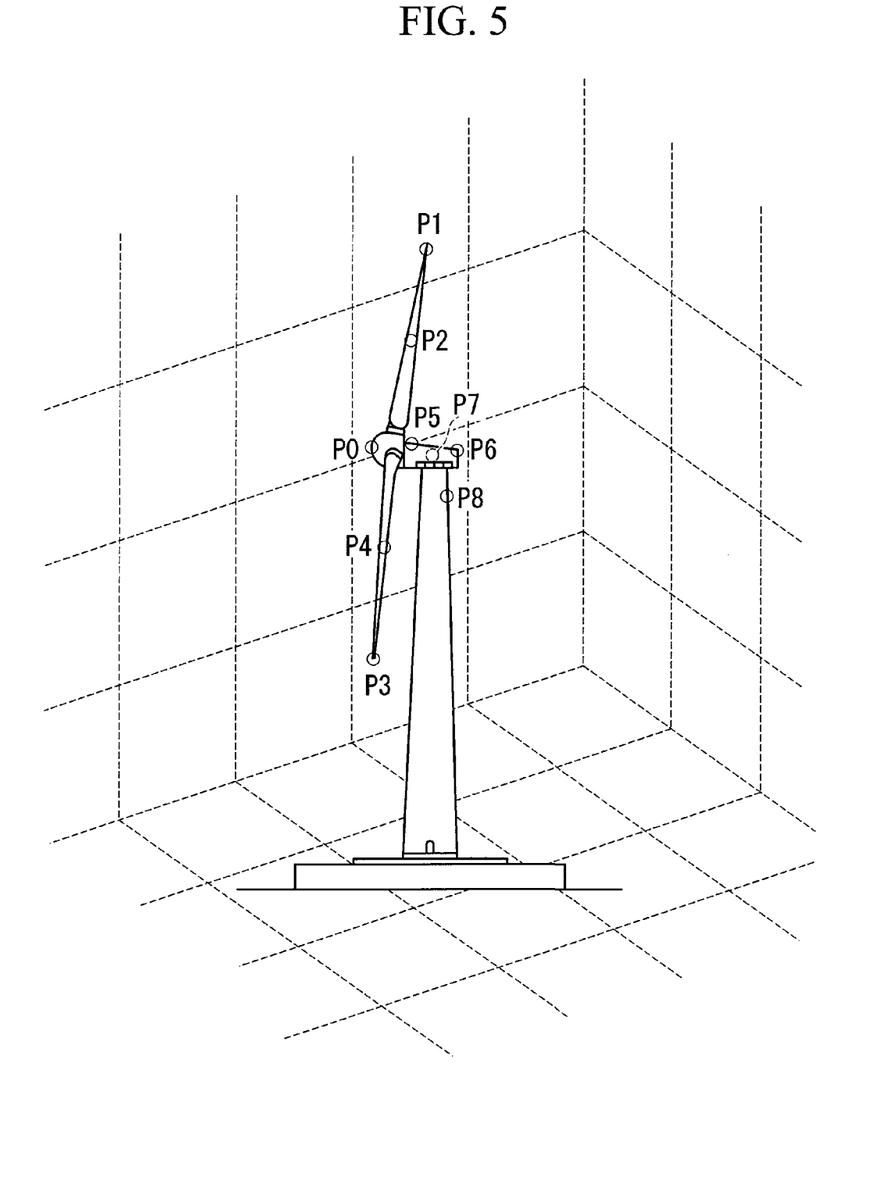
FIG. 5 An explanatory diagram for illustrating a windmill serving as a simulation target set in a simulation space and a plurality of lightning strike-receiving candidate points set on the windmill structure.

As shown in FIG. 5, in a three-dimensional simulation space, the setting unit 12 sets three-dimensional coordinates representing a windmill, i.e., a simulation target, and topography around the windmill. Further, the setting unit 12 sets at least one or more lightning strike-receiving candidate points P0 to P8 and one reference point in this simulation space. Further, the setting unit 12 sets a lightning strike start position and a lightning electric-current peak value. In the present embodiment, the lightning strike-receiving candidate point P0 is set as the reference point. However, the reference point may not necessarily be the same as the lightning strike-receiving candidate point.

The lightning strike-receiving candidate points P0 to P8 and the above three dimensional coordinates representing the windmill and the topography around the windmill may be set based on, for example, three-dimensional data inputted by a user with the input device 4 of FIG. 2 when simulation is performed. Alternatively, when the above data is stored in the storage device 11 in advance, the above data may be set upon being read from the storage device 11.

The lightning strike start position and the lightning electric-current peak value may be set using the data inputted by the user with the input device 4 of FIG. 2, or may be set in a statistical manner using a Monte Carlo method and the like based on the lightning strike data stored in the storage device 11. For example, the Monte Carlo method is a calculation method for deriving an approximate solution by repeating simulation using random numbers many times. For example, the setting unit 12 sets the lightning electric-current peak value by using the Monte Carlo method based on the frequency distribution of lightning electric-current peak value shown in FIG. 3. As described above, the lightning strike start position and the lightning electric-current peak value are set by using the statistical method such as the Monte Carlo method based on statistical data of lightning actually occurred in the nature stored in the storage device 11. Consequently, a tendency in the nature can be reflected, and more realistic initial data can be given. Therefore, accuracy of simulation can be further improved.

Alternatively, one of the lightning strike start position and the lightning electric-current peak value may be set using the lightning strike data stored in the storage device 11, and the other thereof may be set based on the data inputted with the input device 4.

The downward leader advancing unit 13 advances the downward leader from the lightning strike start position set by the setting unit 12. The downward leader advancing unit 13 adds weights to occurrence frequencies based on the lightning strike data stored in the storage device 11 such as the frequency distribution of advancing vertical angle of the downward leader shown in FIG. 4, and advances the downward leader using a probability/statistics theory such as the Monte Carlo method.

More specifically, the downward leader advancing unit 13 obtains a step length Ls of the downward leader based on the following equation (1), and determines an advancing vertical angle ω and a progression horizontal angle 8 of the downward leader by using a random number based on the frequency distribution of advancing vertical angle of the downward leader as shown in FIG. 4.

$$Ls = a \times I^b \times Kl \qquad (1)$$

Figure 6:
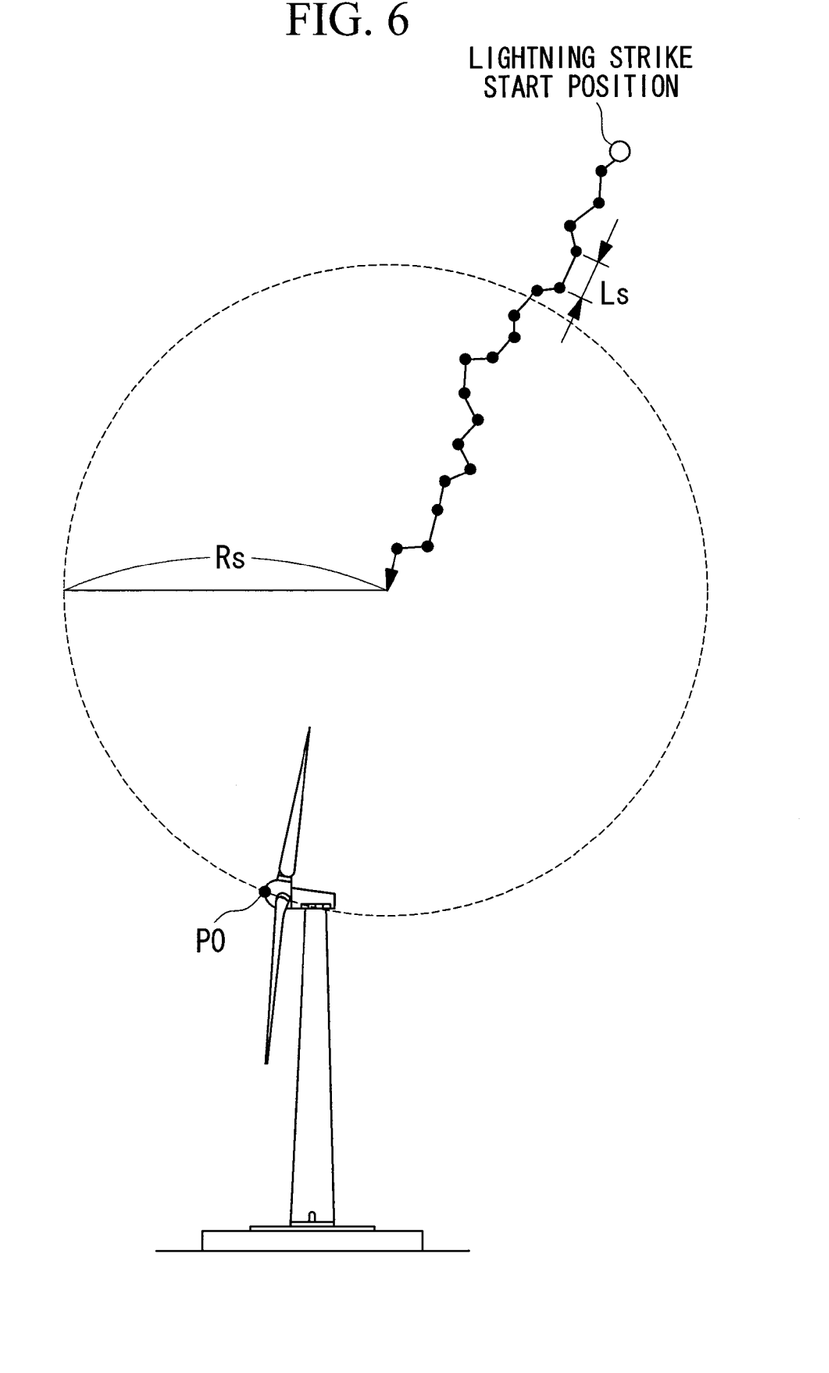
FIG. 6 A diagram for illustrating a method for advancing the downward leader and a first threshold value.

In the equation (1), a and b are constants arbitrarily set, Kl is a correction coefficient arbitrarily set, and I is the lightning electric-current peak value set by the setting unit 12. As shown in FIG. 6, the downward leader advancing unit 13 repeatedly advances the downward leader until a distance between a leading edge of the advanced downward leader and the reference point P0 set in the windmill, i.e., the simulation target, becomes equal to or less than a first threshold value Rs.

The first threshold value Rs is arbitrarily set. The first threshold value Rs may be, for example, inputted by a user with the input device 4, or may be stored as a preset value in the storage device 11 in advance. Alternatively, the first threshold value Rs may be set based on the following equation (2).

$$Rs = c \times I^d \times Ks \qquad (2)$$

In the equation (2), c and d are constants arbitrarily set, Ks is a correction coefficient arbitrarily set, and I is the lightning electric-current peak value set by the setting unit 12.

Figure 7:
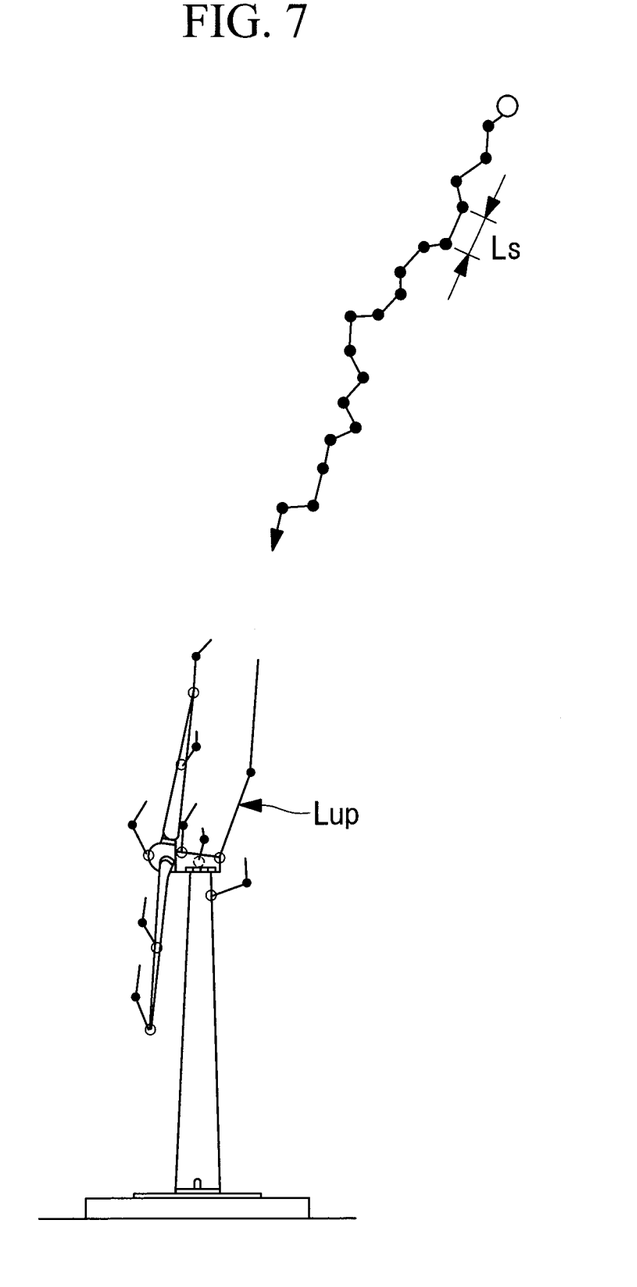
FIG. 7 A diagram for illustrating advance of an upward leader.

The upward leader advancing unit 14 advances the upward leaders from the lightning strike-receiving candidate points P0 to P8 set by the setting unit 12 when a distance between the leading edge of the downward leader and the reference point P0 set in the simulation target becomes within the first threshold value Rs (see FIG. 7).

The upward leader advancing unit 14 determines upward leaders that are to be advanced from the lightning strike-receiving candidate points based on the following equation (3).

$$Lup = e \times I^g \times Kup(i) \qquad (3)$$

In the equation (3), e and g are constants arbitrarily set, I is the lightning electric-current peak value set by the setting unit 12, and Kup(i) is a correction coefficient for the ith lightning strike-receiving candidate point Pi. In other words, the correction coefficient Kup is a value set for each of the lightning strike-receiving candidate points, and reflects the tendency of receiving a lightning strike at the corresponding lightning strike-receiving candidate point. For example, when a lightning strike-receiving candidate point is set on an insulating object, the correction coefficient Kup(i) is set to a relatively low value. When a lightning strike-receiving candidate point is set on a metal object, the correction coefficient Kup(i) is set to a relatively high value. When a lightning strike-receiving candidate point is set on a metal object but is covered by an insulating object, the correction coefficient Kup(i) is set to a relatively low value.

As described above, the accuracy of simulation can be improved by setting the correction coefficient Kup according to the tendency of receiving a lightning strike at each of the lightning strike-receiving candidate points. For example, an angular range (for example, ±5 degrees) for the advancing vertical angle φ and the progression horizontal angle θ of the upward leader may be determined for each lightning strike-receiving candidate point, so that the advancing vertical angle φ and the progression horizontal angle θ may be randomly determined within this angular range. Alternatively, similar to the downward leader described above, the frequency distribution of advancing vertical angle of the upward leader may be set in advance for each lightning strike-receiving candidate point through simulation and the like, and the advancing vertical angle φ and the progression horizontal angle θ of the upward leader may be determined by using a random number based on this frequency distribution.

Figure 8:
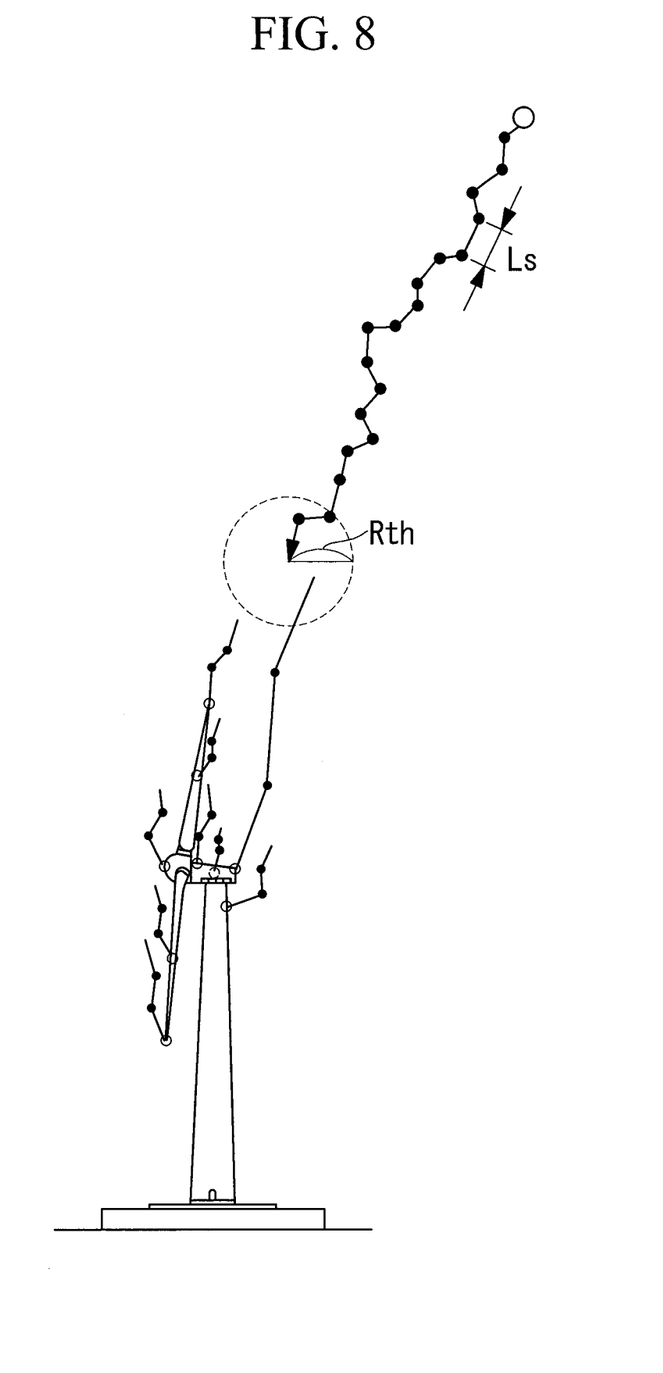
FIG. 8 A diagram for illustrating the advance of the upward leader and a second threshold value.

As shown in FIG. 8, the upward leader advancing unit 14 repeatedly advances the upward leader until a distance between the leading edge of the downward leader and the leading edge of the upward leader advanced from any one of the lightning strike-receiving candidate points becomes equal to or less than a second threshold value Rth.

The second threshold value Rth is arbitrarily set. The second threshold value Rth may be, for example, set for each lightning strike-receiving candidate point as shown in the following equation (4).

$$Rth = Ls + Lup(i) \tag{4}$$

In this case, Ls is the final step length of the downward leader, and Lup(i) is the latest step length of the upward leader advanced from each lightning strike-receiving candidate point.

When a distance between the leading edge of the upward leader advanced by the upward leader advancing unit 14 and the leading edge of the downward leader becomes equal to or less than the second threshold value Rth, the lightning strike point determining unit 15 determines that the lightning strike-receiving candidate point corresponding to that upward leader is a lightning strike position, and outputs the determination result.

The lightning strike point outputted by the lightning strike point determining unit 15 is displayed on, for example, the output device 5 (see FIG. 2) of the lightning strike simulation apparatus 10, and is stored as a simulation result to the auxiliary storage device 3 or an external storage device (not shown). At this time, the lightning strike point obtained as the simulation result is stored in association with conditions under which this simulation result is obtained, namely, initial condition data set in the current simulation such as coordinate data of the lightning strike-receiving candidate points set by the setting unit 12, the lightning electric-current peak value I, a coordinate value of the lightning strike start position, and coordinate values of the downward leader and the upward leaders, and various data obtained through the processing steps in the current simulation.

Subsequently, the processings executed by each unit of the above-described lightning strike simulation apparatus 10 will be described with reference to FIG. 9. It should be noted that the below-described various processings performed by each unit shown in FIG. 2 are achieved by causing the CPU 1 shown in FIG. 1 to load a lightning strike simulation program stored in the auxiliary storage device 3 to the main storage device 2 and execute the lightning strike simulation program.

In the present embodiment, as described above, a case where a windmill is the simulation target is described by way of example.

Figure 9:
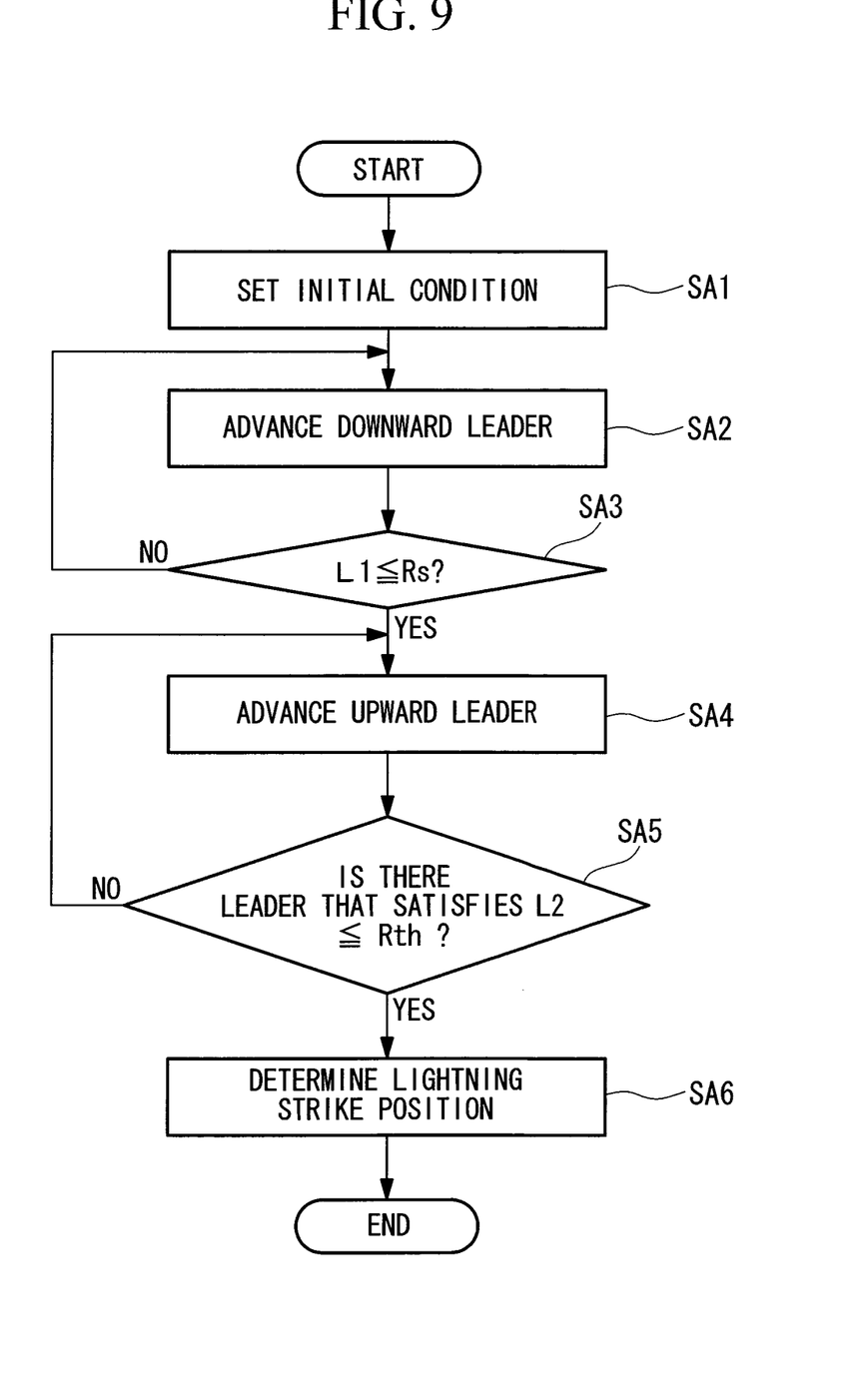
FIG. 9 A diagram for illustrating a flowchart of a lightning strike simulation method according to the first embodiment of the present invention.

First, the setting unit 12 sets initial conditions (step SA1 of FIG. 9). More specifically, three-dimensional coordinates representing a windmill, i.e., a simulation target, and topography around the windmill are set in a three-dimensional simulation space. Further, the lightning strike-receiving candidate points P0 to P8 are set in this simulation space. Further, the lightning strike start position, the lightning electric-current peak value, and the reference point are set.

When the initial conditions are set, the downward leader advancing unit 13 advances the downward leader form the lightning strike start position (step SA2). On every advance of the downward leader, determination is made as to whether a distance L1 between the leading edge of the advanced downward leader and the reference point is equal to or less than the first threshold value Rs (step SA3). When the distance L1 is determined to be larger than the first threshold value Rs, the program returns to step SA2, so that the downward leader is advanced again. On the other hand, when the distance L1 between the leading edge of the advanced downward leader and the reference point is determined to be equal to or less than the first threshold value Rs in step SA3, the advance of the downward leader is stopped, and the upward leader advancing unit 14 begins to advance the upward leader (step SA4). Therefore, the upward leaders are advanced from the respective lightning strike-receiving candidate point P0 to P8.

Figure 10:
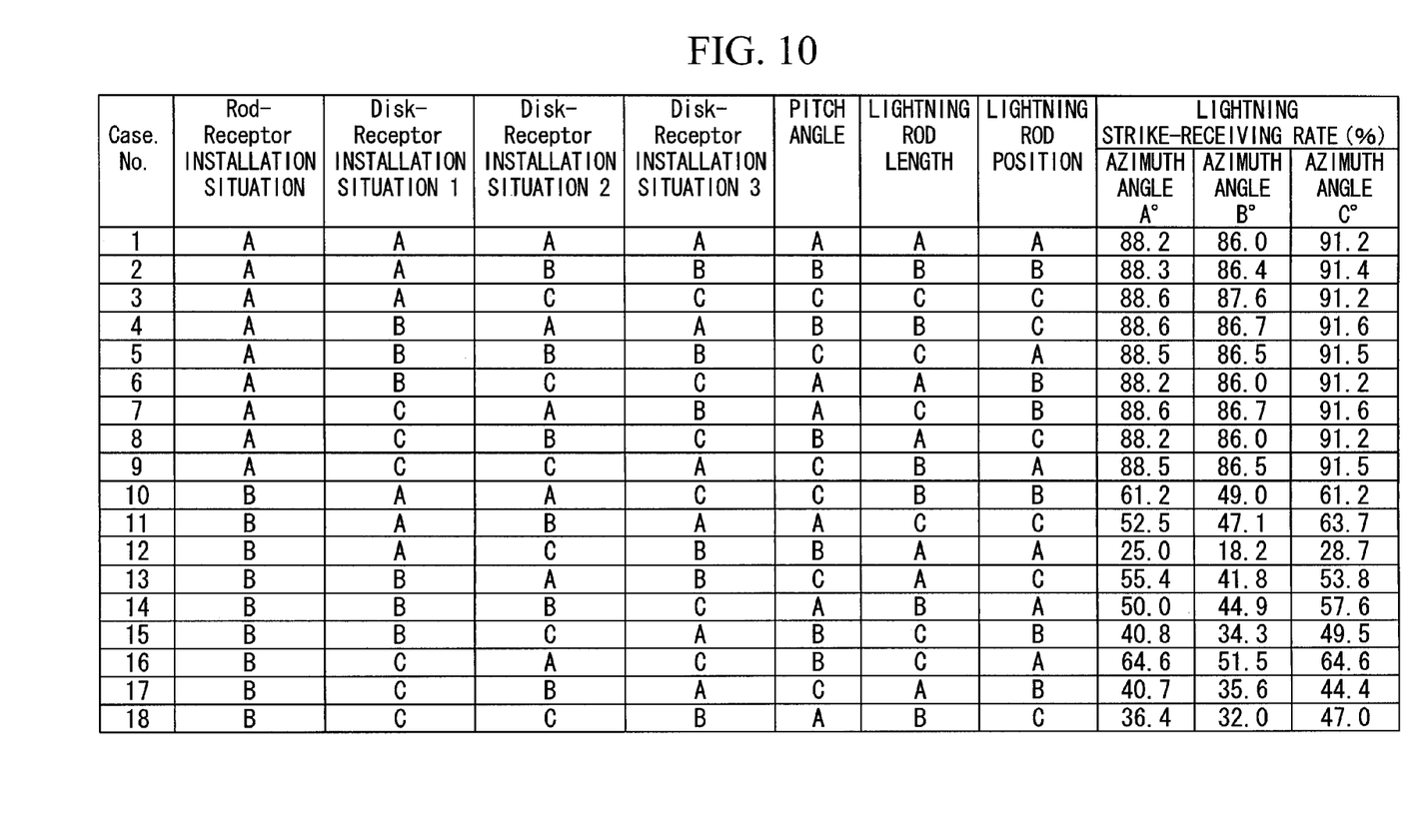
FIG. 10 A diagram for illustrating an example of simulation calculation result obtained by calculating a simulation result according to the first embodiment of the present invention.

Every time the upward leader is advanced from each of the lightning strike-receiving candidate points P0 to P8, determination is made as to whether a distance L2 between the leading edge of each of the advanced upward leaders and the leading edge of the downward leader is equal to or less than the second threshold value Rth (step SA5). When the distance L2 is determined to be larger than the second threshold value Rth at each of the lightning strike-receiving candidate points, the program returns to step SA4, and the upward leaders are advanced from the lightning strike-receiving candidate points P0 to P8 again. On the other hand, the distance L2 between the leading edge of any one of the advanced upward leaders and the leading edge of the downward leader is determined to be equal to or less than the second threshold value Rth in step SA5, the advance of the upward leader is stopped, and the lightning strike point determining unit 15 determines that the lightning strike-receiving candidate point corresponding to the upward leader that has reached the second threshold value Rth is the lightning strike point, and outputs the determination result (step SA6). As a result, the simulation result is displayed on the output device 5 (see FIG. 1) such as a display screen, and is stored as a simulation result to the auxiliary storage device 3 or an external storage device. FIG. 10 shows an example of simulation calculation result obtained by calculating the simulation result according to the present invention.

As described above, the simulation apparatus, method, and program according to the present invention perform a lightning strike simulation based on the lightning strike data generated based on raw data collected from the nature stored in the storage device 11, thus providing a highly realistic, accurate simulation result. Further, the correction coefficient is set for each lightning strike-receiving candidate point, so that the tendency of receiving lightning at the lightning strike-receiving candidate point can be reflected when the upward leader is advanced. Therefore, the tendency for receiving a lightning at each lightning strike-receiving candidate point can be reflected in the simulation result.

For example, such a lightning strike simulation apparatus according to the present invention may be used in the following case: when lightning rods are arranged only at some of a plurality of lightning strike-receiving candidate points, the above lightning strike simulation is performed under this condition, and the frequencies of lightning strikes (lightning strike-receiving rates) to the lightning strike-receiving candidate points arranged with the lightning rods are determined, so that it is possible to examine whether the arrangement positions of the lightning rods are appropriate or not.

In addition, the above simulation result may be used as input parameters to a well-known optimization method such as a Taguchi method and the like, and the optimization processing may be performed, so that the optimum arrangement positions of lightning rods and the like in a simulation space or on a simulation target can be obtained.

In the present embodiment, the lightning strike-receiving candidate points are set only on the windmill serving as the simulation target. Alternatively, when topographic features and structures are arranged around the simulation target in the simulation space, the lightning strike-receiving candidate points may also be arranged on these structures and land surfaces. In this way, not only the windmill serving as the simulation target but also the surrounding area therearound may be considered, so that probabilities of receiving lightning strikes in the surrounding area may also be obtained.

Especially, in a case of a wind firm in which a plurality of windmills are arranged in a certain region, a lightning rod tower may be constructed in the wind firm instead of arranging a lightning rod to each of the windmills. In this case, conditions of lightning strikes in the entire wind farm may be grasped by setting lightning strike-receiving candidate points on the lightning rod tower and the plurality of windmills installed in the wind firm.

Second Embodiment

Subsequently, a second embodiment according to the present invention will be described.

For example, the tendency of receiving a lightning strike is different according to various factors such as season and topography. Therefore, the factors affecting the tendency of receiving lightning strikes are stored in the storage device 11 in association with lightning strike data. When simulation is performed, a lightning strike simulation apparatus reads from the storage device 11 the lightning strike data associated with the affecting factor corresponding to the condition under which simulation is performed (for example, the season is summer, and the location is X city), and the above simulation is performed using these lightning strike data. Examples of affecting factors include season, ratio of polarity, lightning discharge duration, multiple-strike lightning occurrence ratio, thundercloud altitude, thundercloud coming direction, ground flash density, and the number of days of thunderstorms in a year.

Specifically, the frequency distribution of lightning electric-current peak value as shown in FIG. 3 and the frequency distribution of advancing vertical angle of the downward leader as shown in FIG. 4 are generated for each affecting factor such as season and topography, and are stored in the storage device 11. When simulation conditions, e.g., information identifying affecting factors such as "summer" and "X city", are inputted from the input device 4 (see FIG. 2) at the start of simulation, the setting unit 12, the downward leader advancing unit 13, and the upward leader advancing unit 14 read the lightning strike data specified by a designated affecting factor from the storage device 11, and use the read lightning strike data to perform the setting processing and advance the downward leader and the upward leaders in the same manner as the above.

As described above, the factor affecting the tendency of receiving lightning strikes are identified based on the simulation conditions, and the lightning strike simulation is performed using only the lightning strike data corresponding to this affecting factor, so that the accuracy of simulation can be further improved.

Third Embodiment

Subsequently, the lightning strike simulation apparatus according to a third embodiment of the present invention will be described.

In the present embodiment, the correction coefficient Kup (i) used to advance the upward leaders is optimized by using an optimization calculation method.

Specifically, the lightning strike simulation according to the first embodiment is repeated a predetermined number of times, so that a lightning strike-receiving rate at each lightning strike-receiving candidate point is obtained. Then, this lightning strike-receiving rate is given as an initial value of optimization calculation, and a correction coefficient for making the lightning strike rate to be similar to a reference value is obtained for each lightning strike-receiving candidate point. As described above, the correction coefficient is optimized, so that the accuracy of lightning strike simulation can be further improved.

When the optimization calculation is performed, it is preferable to give factors affecting the tendency of receiving a lightning strike such as topography and surrounding environment, for example, topography (for example, land and sea), wind condition, altitude, relief of surrounding topography, shape and arrangement of windmill, shape and arrangement of independent lightning rod tower, shapes and arrangements of surrounding structures, blade surface condition of windmill (salt pollution state, water drop adhesion, freezing, and the like), soil resistance, grounding resistances of various facilities.

The embodiments according to the present invention has been described above in detail with reference to the drawings, but the specific configuration is not limited to the above embodiments. It is to be understood that design changes within the scope of the gist of the present invention are also included.

The invention claimed is:

1. A lightning strike simulation apparatus comprising:
 a storage unit for storing lightning strike data generated based on statistical data of a lightning strike occurred in nature;
 a setting unit for setting in a simulation space a simulation target, at least one or more lightning strike-receiving candidate points, a reference point, a lightning strike start position, and a lightning electric-current peak value;
 a downward leader advancing unit for advancing a downward leader from the lightning strike start position set by the setting unit;
 an upward leader advancing unit for respectively advancing upward leaders from the lightning strike-receiving candidate points set in the simulation space, when a distance between a leading edge of the downward leader and the reference point is within a first threshold value; and
 a lightning strike point determining unit for, when a distance between the leading edge of the downward leader and a leading edge of any one of the upward leaders is within a second threshold value, determining that a lightning strike-receiving candidate point corresponding to the any one of the upward leaders is a lightning strike point, wherein the downward leader advancing unit and the upward leader advancing unit respectively advance the downward leader and the upward leader based on the lightning strike data stored in the storage unit.

2. The lightning strike simulation apparatus according to claim 1, wherein the upward leader advancing unit changes advancement of the upward leader in accordance with a tendency of receiving a lightning strike at the lightning strike-receiving candidate point.

3. The lightning strike simulation apparatus according to claim 1, wherein the storage unit stores the lightning strike data in association with an affecting factor that affects the tendency of receiving a lightning strike, and wherein when the setting unit sets a simulation condition, the downward leader and the upward leader use the lightning strike data corresponding to the simulation condition to respectively advance the downward leader and the upward leader.

4. The lightning strike simulation apparatus according to claim 1, wherein at least one windmill is set as a simulation target in the simulation space.

5. The lightning strike simulation apparatus according to claim 1, wherein the setting unit sets the lightning strike start position and the lightning electric-current peak value by using a random number based on the lightning strike data stored in the storage unit.

6. The lightning strike simulation apparatus according to claim 1 further comprising an input unit, wherein when the lightning strike-receiving candidate point is inputted from the input unit, the setting unit sets the lightning strike-receiving candidate point based on this input information.

7. A lightning strike simulation method executed by the lightning strike simulation apparatus according to claim 1, said lightning strike simulation method comprising the steps of:

setting a simulation target in a simulation space, at least one or more lightning strike-receiving candidate points, a reference point, a lightning strike start position, and a lightning electric-current peak value;

advancing a downward leader from the lightning strike start position having been set;

respectively advancing upward leaders from the lightning strike-receiving candidate points set in the simulation space, when a distance between a leading edge of the downward leader and the reference point is within a first threshold value; and when a distance between the leading edge of the downward leader and a leading edge of any one of the upward leaders is within a second threshold value, determining that a lightning strike-receiving candidate point corresponding to the any one of the upward leaders is a lightning strike point, wherein the downward leader and the upward leader are respectively advanced based on lightning strike data generated based on statistical data of lightning strike occurred in nature.

8. A non-transitory computer readable medium containing computer instructions stored therein for causing a computer processor to execute the processing of:

setting a simulation target in a simulation space, at least one or more lightning strike-receiving candidate points, a reference point, a lightning strike start position, and a lightning electric-current peak value;

advancing a downward leader from the lightning strike start position, based on lightning strike data generated based on statistical data of lightning strike occurred in nature;

respectively advancing upward leaders from the lightning strike-receiving candidate points set in the simulation space based on the lightning strike data, when a distance between a leading edge of the downward leader and the reference point is within a first threshold value; and when a distance between the leading edge of the downward leader and a leading edge of any one of the upward leaders is within a second threshold value, determining that a lightning strike-receiving candidate point corresponding to the any one of the upward leaders is a lightning strike point.

* * * * *